Figure 1:
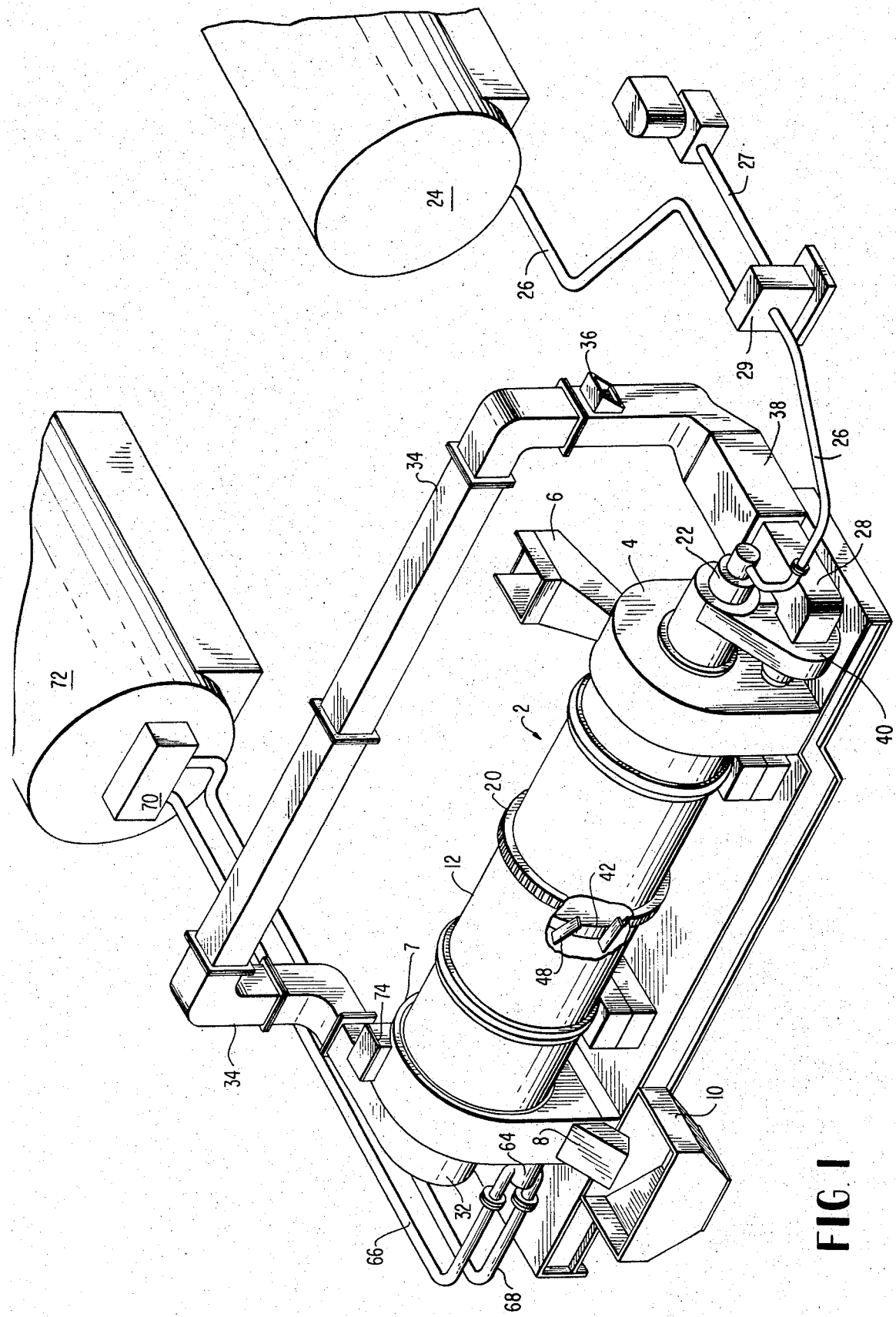

United States Patent [19]

Dydzyk

[11] 3,866,888

[45] Feb. 18, 1975

[54] APPARATUS FOR MAKING HOT ASPHALT PAVING MATERIAL

[75] Inventor: Michael Dydzyk, Baltimore, Md.

[73] Assignees: Thomas I. Baldwin; William E. Baldwin; Frank P. Scrivener, all of Millersville, Md. ; a part interest to each

[22] Filed: Jan. 26, 1973

[21] Appl. No.: 326,730

[52] U.S. Cl. .................................... 259/158, 259/3
[51] Int. Cl. .......................................... B28c 1/22
[58] Field of Search .......... 259/155, 156, 157, 158, 259/159, 3, 14, 30

[56] References Cited
UNITED STATES PATENTS 2,188,798  1/1940  Smith ................................ 259/155
2,487,887  11/1949  McEachran ......................... 259/158
3,693,945  9/1972  Brock ................................. 259/158

*Primary Examiner*—Robert W. Jenkins
*Attorney, Agent, or Firm*—Browne, Beveridge, DeGrandi & Kline

[57] ABSTRACT

Hot asphalt paving material is made in a rotary drum mixer which has a burner at the aggregate-introducing end and an interior transverse flame shield in the path of the burner to divide the rotary drum into a drying section and a mixing section. Means are provided in the mixing section for introducing asphalt cement into the dried aggregate material and for agitating the mix. Exhaust gases from the mixing section are passed through a heating and cooling heat exchanger and returned to the burner.

9 Claims, 2 Drawing Figures

APPARATUS FOR MAKING HOT ASPHALT PAVING MATERIAL

This invention relates to an apparatus for making hot asphalt paving material on a continuous feed and discharge basis.

At the present time, most bituminous asphalt paving materials are made in batch-type mixers provided with a pugmill which receives measured quantities of hot asphalt cement and solid particulate material known in the art as aggregate. The quality of paving material made by such bituminous mixing plants is quite high, but there are a number of recognized disadvantages to such a batch-type process. Large surge and storage tanks are often used in order to hold a reserve supply of hot asphalt paving material so it will be available when trucks arrive to be loaded. In the absence of surge and storage tanks, it is necessary for the trucks to stand idle as they wait for the batches of paving material to be mixed and released into the truck.

There have been proposals heretofore for continuously mixing bituminous paving materials. These processes have involved the use of a rotary drum mixer which is interiorly heated by a burner. Hot asphalt, sometimes emulsified after being mixed with water and additives, is introduced into the aggregate material either before or after it is fed into the drying and mixing rotary drum. It has been recognized that apparatus of this type has reduced dust emissions due to the contact within the drum between the asphalt and the dust particles.

According to one feature of the present invention, the exhaust gases from a rotary drum unit are returned to the intake thereof, after first having its temperature raised or lowered as necessary to provide maximum efficiency. These recycled exhaust gases, mixed with ambient air if needed, are injected into the burner combustion area so that its elevated temperature and any flammable constitutents thereof will aid in the combustion process.

Another feature of the invention, usable together with or separately from the exhaust recirculation system, involves the apparatus and method whereby a single rotary drum unit is used to dry the aggregate material before it is mixed with the asphalt, wherein both the heating and mixing steps are performed in a rotary drum unit. According to the preferred embodiment, a single rotary drum is used and the heating chamber is separated from the mixing chamber by means of a flame shield which is a refractory wall located directly in the path of the flame emitted by the burner for the drying section.

Other features of the invention are concerned with the relative positioning of the elements in the mixing chamber where hot asphalt is sprayed into the preheated and dried aggregate. The intake for the exhaust fan extends a substantial distance inwardly into the mixing chamber and confronts the flame shield in order to cause the preferred pattern of gas circulating within the drum. The means for feeding the hot asphalt into the aggregate also extends a substantial distance into the mixing chamber and is oriented to feed the hot asphalt material radially outwardly into the heated aggregate material.

Figure 2:
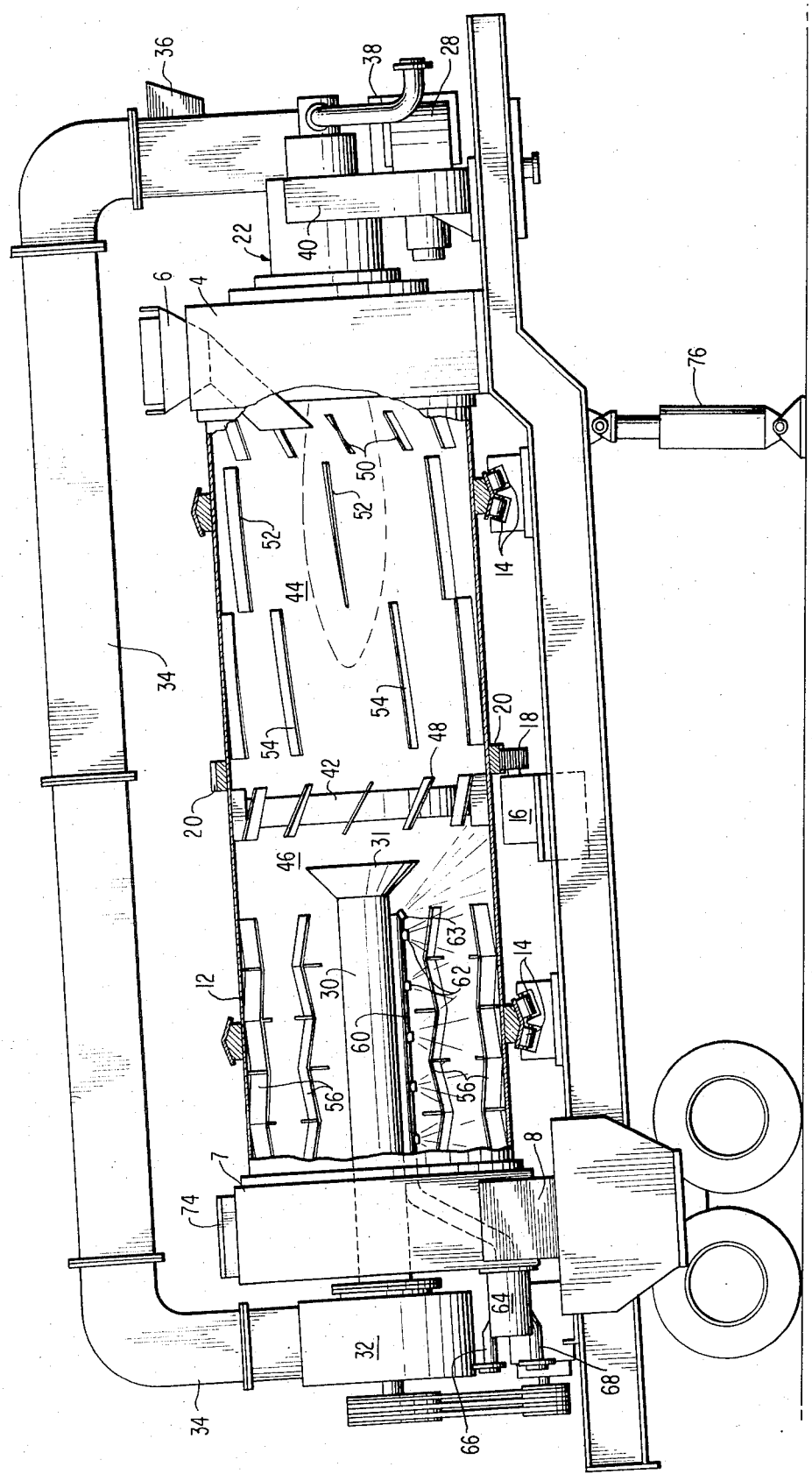

A more complete understanding of the invention may be had by referring to the accompanying drawings wherein FIG. 1 is a perspective view of a typical plant layout for making continuous hot mix asphalt paving material according to the invention and, FIG. 2 is a vertical sectional view through the rotary drum unit.

In FIG. 1 it will be seen that the rotary drum unit 2 resembles a conventional dryer of the type now used for drying aggregate prior to its introduction into a batch-type mixing plant. It has a cylindrical body with a horizontal axis which is slightly inclined downwardly from the inlet end to the outlet end in order to promote the flow of material therethrough. The inlet end is provided with a stationary housing 4 provided with a hopper 6 which receives the aggregate from a feed conveyor of conventional construction. A stationary housing 7 is located at the outlet end of the rotary drum unit and this includes a discharge chute 8 which releases the mixed asphalt paving material into a weigh hopper, a bin 10 or onto a conveyor which carries the material upwardly into a truck or a surge and storage bin of substantial capacity.

Extending between the stationary housings 4 and 7 is the rotary drum 12 which, as shown in FIG. 2, is supported on the trunnions 14 and is positively driven by a variable speed motor 16 having a spur gear 18 for engaging the external teeth of a ring gear 20 on the drum. The motor 10 is preferably a variable speed hydraulic motor.

At the inlet end of the rotary drum unit, there is a burner assembly 22 which releases a flame axially inwardly into the drum 12 in order to heat and dry the aggregate material in the drying section of the drum. The fuel for the burner assembly may be oil or liquified gas stored in storage tank 24 and carried by a conduit 26 through conventional metering and mixing systems to the burner assembly 22. Natural gas may be an alternate type of fuel, being fed to the burner assembly through conduit 27 and selection valve assembly 29. The burner assembly 22 also receives preheated gases from the duct 28 which combines with the fuel in the area of combustion in the drum 12. The burner assembly 22 is of conventional construction and may be of any standard type presently used for firing rotary drum aggregate dryers. A low pressure air atomizing burner tip is suitable for use with fuel oil. A high pressure natural gas burner may be used when only natural gas is available; or, a combination burner assembly permits the selective use of LP gas, natural gas or fuel oil.

As will later be described, the aggregate material within the drum first passes through a drying section and then through a mixing section where it is brought into contact with hot penetrating grade asphalt cement. No water or additives are used. The mixed paving material is released through the discharge chute 8. The gaseous materials in the drum are removed through an exhaust duct 30 shown in FIG. 2 which leads to the intake side of a centrifugal blower 32. The discharge side of the blower 32 leads to a recirculating duct system 34 which carries the gases back toward the inlet end of the rotary drum unit. These recirculating gases may be supplemented by outside air introduced through the makeup air unit 36 and then passed through a heat exchanger 38 which automatically raises or lowers the temperature of the gases to a desired level. The air and gases are drawn through the duct 28 by the centrifugal blower 40 which discharges into the burner assembly 22.

The internal construction of the drum 12 is shown in FIG. 2 where it will be noted that the drum has a solid flame shield 42 extending transversely across its midportion to divide the drum interior into a drying chamber 44 and a mixing chamber 46. The circular periphery of the flame shield 42 is less than the inside diameter of the drum, thereby affording an annular opening extending through the plane of the wall 42 to permit dried aggregate material to flow from the drying chamber into the mixing chamber. Inclined transfer feed bars 48 serve both to connect the flame shield or wall 42 to the drum and to promote the flow of aggregate material from the drying chamber to the mixing chamber.

The drying chamber 44 is constructed and operates in the same manner as rotary drum dryers presently used with pugmill asphalt mixing plants. It is provided with lifting flight bars which elevate the material and cause it to cascade and fall downwardly through the burner flame and the adjacent heated area, thereby evaporatively driving at least about 5 percent of the surface moisture from the aggregate material. The inlet feeder bars 50 extend a relatively short axial distance through the apparatus, and have a greater inclination that the subsequent lifter flight bars in order to promote movement of the aggregate material away from the spring loaded mechanical seal which operates between the stationary housing 4 and the inlet end of the drum 12. The two sets of flight bars 52 and 54 are somewhat longer in the axial dimension and their inclination is relatively slight. It is possible to have these flight bars 52 and 54 oriented parallel to the axis of the drum if the drum is inclined a sufficient amount to provide for axial movement of aggregate material therethrough under the partial effect of gravity.

Upon rotation of the drum 12, the aggregate material is repeatedly elevated and then sprinkled and cascaded downwardly through the area heated by the flame from the burner assembly 22. The actual flame may extend only about halfway through the drying chamber 44, but the area of intense heat located radially around and axially beyond the tip of the flame is such that moisture will be evaporated from the aggregate material in order to promote the subsequent penetration of hot asphalt into the structure of the individual particles of aggregate material.

The rotational velocity, structure and inclination of the rotary drum is such that the aggregate material arriving in the vicinity of the flame shield 42 has dried sufficiently to be receptive to impregnation by and admixture with hot penetrating grade asphalt cement. In the mixing chamber, the material is agitated by the flight bar assemblies 56 which elevate the aggregate material and let it fall downwardly from the upper portions of the drum. A stationary exhaust gas outlet pipe 30 having an exteriorly flaring end portion 31 extends centrally through the mixing chamber 46 into confrontation with the downstream end of the flame shield 42. On the underside of the exhaust conduit 30 is a pipe 60 which has an inclined spray nozzle 63 and spray nozzles 62 directed radially with respect to the drum axis and downwardly into the body of aggregate material located in the mixing chamber 46. The amount of asphalt dispensed into the drum is governed by a control valve unit 64 which receives asphalt from a supply conduit 66 and returns the excess asphalt through the return conduit 68. As shown in FIG. 1, these conduits are connected at their opposite ends to a heating and pumping unit 70 which is mounted on one wall of the asphalt supply tank 72.

As will be seen in FIG. 2, the dryer flight bars 52 and 54 and the mixer flight bars 56 do not extend the full distance to the flame shield 42. This construction reduces the amount of airborne solid particles in that it provides a settling zone in the vicinity of the flame shield. In this settling zone, the material is not lifted and dropped, thereby permitting some of the smaller aggregate particles to settle into the aggregate material at the bottom of the drum. The substantial inclination of the transfer feeder bars 48 causes the aggregate to flow past the flame shield without significant dust-liberating agitation. The asphalt spray nozzle 63 is oriented to strike the aggregate in the settling zone where it is preliminarily mixed by a gradual tumbling action. This preliminary mixing brings the small aggregate particles into contact with the hot asphalt to prevent them from being released into the gaseous stream during the subsequent mixing operations.

The construction of the apparatus promotes the removal of airborne solid particles from the gaseous stream since the hot gaseous stream leaving the drying chamber must first pass around the periphery of the flame shield 42, where its velocity will tend to carry it into the area of the flight bars 56 in the mixing chamber of the apparatus. In this area, the aggregate covered with asphalt will be falling downwardly through the turbulent stream of gases. Therefore, any airborne solid particles will tend to adhere on contact to the aggregate particles which are tacky due to the presence of the hot asphalt material. The gaseous stream, with a large portion of the airborne dust particles removed by such adhesion, then returns to the outwardly flared end 31 of the air exhaust conduit 30. The centrifugal blower 32 then returns the gases and any remaining airborne particles toward the inlet end of the apparatus through the recirculating duct 34. If recovery of the airborne particles is desired, the exhaust gases may be processed by a conventional centrifugal dust separator of the cyclone or skimmer type before the gases are introduced into the inlet end of the apparatus.

The illustrated system provides a large degree of flexibility in the handling of the gaseous streams in the apparatus. If there is an excessive buildup of exhaust gases, it is possible to release some of these gases through the emergency exhaust duct 74. It may be operated automatically or by an operator who monitors the conditions within the plant. The exhaust gases may be mixed with outside air drawn through the unit 36 to whatever extent is necessary to support combustion in the drying chamber. The heat exchanger unit 38 is located in the gaseous flow path leading to the burner assembly 22. Within this heat exchanger unit 38 are conventional air conditioning cooling and heating means which are automatically controlled to maintain the gases arriving at the burner assembly 22 at a desired temperature, preferably about 300°F.

The rate of flow of the material through the rotary drum unit is governed by several factors including the rate of feed of aggregate material into the apparatus, the angulation of the flights within the drum, the rotational velocity of the drum and the inclination of the drum axis. The rotational velocity of the drum is varied by changing the speed of the motor 16. The inclination of the drum may be adjusted in order to achieve a desired flow rate by means of an hydraulic ram 76 which rests on the ground and is connected at its upper end to the drum-supporting frame. As the ram is extended, the inclination of the drum is increased. Conversely, as the ram is contracted, the inclination of the rotary drum unit diminishes to reduce the rate of flow through the apparatus. Preferably, the ram 76 is of the conventional self-locking type which locks itself in position automatically when in the selected position.

The overall operation of the apparatus is monitored and controlled by an operator stationed at a control center. The control center is provided with indicating devices which receive signals from sensors located in the apparatus, indicating the temperature, pressure and moisture content of gases throughout the apparatus; the temperature and moisture content of the materials within the drum and at its outlet; the feed rates and the conditions of material introduced into the drum; and the inclination and angular velocity of the drum. The apparatus should have the following auxiliary controls which have been listed and recognized as important features for quality production in a drum mixer by the Quality Improvement Committee of the National Asphalt Pavement Association:

1. Separate cold feed controls for each material;
2. Interlocking of cold feed and asphalt flow, (and also of additive and water flow if used);
3. Provisions for determining moisture content of aggregate so dry weight of cold feed can be determined for proper setting of asphalt flow (and setting of water and additive flow if used);
4. Provisions for sampling individual cold feeds and provision for sequential sampling of aggregate and asphalt under full scale production (and for sampling water and additive if used);
5. Temperature sensing of mix at discharge and automatic burner controls;
6. Primary collector with feed back of material.

Persons skilled in the art will recognize that there are a number of additions to and modifications of the illustrated embodiment which will achieve the goals of the invention in substantially the same way. Therefore, it is emphasized that the invention is not limited to the single embodiment shown, but also includes processes and apparatus falling within the spirit of the claims which follow.

I claim:

1. Apparatus for making asphalt paving material from a particulate aggregate material and asphalt, comprising, a rotary drum having an inlet end and an outlet end,
means for rotating the drum about its longitudinal axis,
said drum having a drying section extending inwardly from the inlet end thereof and a mixing section extending inwardly from the outlet end thereof,
burner means for directing a flame into the drying section,
means for lifting the aggregate material in the drying section and releasing the material so lifted downwardly through the area heated by the flame for removal of moisture,
a heat shield located within the drum in axial alignment with the flame,
said heat shield defining the downstream end of the drying section and the upstream end of the mixing section,
an opening in the plane of the shield permitting the flow of aggregate material from the drying section to the mixing section,
means in the mixing section for introducing hot asphalt into the aggregate material,
agitator means in the mixing section for agitating and mixing together the asphalt and aggregate material,
means for withdrawing exhaust gases from the mixing section, and
recirculation means for returning the exhaust gases and airborne solid particles therein to the drying section at the inlet end of the rotary drum whereby the heat and combustible constitutents of the exhaust gases aid the combustion process in the drying section and the airborne solid particles are removed from the gases upon contact with the hot asphalt in the mixing section.

2. The apparatus of claim 1 wherein the means for withdrawing exhaust gases from the mixing chamber has an exhaust gas inlet pipe which projects inwardly into the mixing chamber toward the heat shield.

3. The apparatus of claim 1 having air conditioning means for heating and cooling the exhaust gases which are being returned to the drying chamber at the inlet end of the rotary drum.

4. Apparatus for making asphalt paving material from a particulate aggregate material and asphalt, comprising, a rotary drum having an inlet end and an outlet end,
means for rotating the drum about its longitudinal axis,
burner means for directing a flame into the rotary drum,
means for lifting the aggregate material in the drying section and releasing the material so lifted downwardly through the flame and in the vicinity thereof for removal of moisture,
means in the rotary drum for introducing hot asphalt into the aggregate material,
agitator means in the rotary drum for agitating and mixing together the asphalt and aggregate material,
means for withdrawing exhaust gases from the rotary drum, and
recirculation means for returning the exhaust gases and airborne solid particles therein to the inlet end of the rotary drum whereby the heat and combustible constitutents of the exhaust gases aid the combustion process and the airborne solid particles are removed from the gases upon contact with the hot asphalt in the rotary drum.

5. The apparatus of claim 4 having air conditioning means for heating and cooling the exhaust gases which are being returned to the drying chamber at the inlet end of the rotary drum.

6. Apparatus for making asphalt paving material from a particulate aggregate material and asphalt, comprising, a rotary drum having an inlet end and an outlet end,
means for rotating the drum about its longitudinal axis,
said drum having a drying section extending inwardly from the inlet end thereof and a mixing section extending inwardly from the outlet end thereof,
burner means for directing a flame into the drying section,
means for lifting the aggregate material in the drying section and releasing the material so lifted downwardly through the area heated by the flame for removal of moisture,
a heat shield located within the drum in axial alignment with the flame, said shield being a body of refractory material which is concentric with and transverse to the rotational axis of the drum,
said heat shield defining the downstream end of the drying section and the upstream end of the mixing section,
an opening in the plane of the shield permitting the flow of aggregate material from the drying section to the mixing section, said opening being an annular space lying between the outer periphery of the shield and the interior wall of the drum,
means in the mixing section for introducing hot asphalt into the aggregate material,
agitator means in the mixing section for agitating and mixing together the asphalt and aggregate material.

7. Apparatus for making asphalt paving material from a particulate aggregate material and asphalt, comprising,
a rotary drum having an inlet end and an outlet end,
means for rotating the drum about its longitudinal axis,
said drum having a drying section extending inwardly from the inlet end thereof and a mixing section extending inwardly from the outlet end thereof,
burner means for directing a flame into the drying section,
means for lifting the aggregate material in the drying section and releasing the material so lifted downwardly through the area heated by the flame for removal of moisture,
a heat shield located within the drum in axial alignment with the flame,
said heat shield defining the downstream end of the drying section and the upstream end of the mixing section,
an opening in the plane of the shield permitting the flow of aggregate material from the drying section to the mixing section,
means in the mixing section for introducing hot asphalt into the aggregate material,
agitator means in the mixing section for agitating and mixing together the asphalt and aggregate material,
said means for lifting the aggregate material in the drying section and the agitator means in the mixing section being flight bars attached to the interior of the drum, and
means for withdrawing exhaust gases from the mixing chamber, said means for withdrawing exhaust gases having an exhaust gas inlet pipe which projects inwardly beyond the flight bars.

8. Apparatus for making asphalt paving material from a particulate aggregate material and asphalt, comprising,
a rotary drum having an inlet end and an outlet end,
means for rotating the drum about its longitudinal axis,
said drum having a drying section extending inwardly from the inlet end thereof and a mixing section extending inwardly from the outlet end thereof,
burner means for directing a flame into the drying section,
means for lifting the aggregate material in the drying section and releasing the material so lifted downwardly through the area heated by the flame for removal of moisture,
a heat shield located within the drum in axial alignment with the flame,
said heat shield defining the downstream end of the drying section and the upstream end of the mixing section,
an opening in the plane of the shield permitting the flow of aggregate material from the drying section to the mixing section,
means in the mixing section for introducing hot asphalt into the aggregate material,
agitator means in the mixing section for agitating and mixing together the asphalt and aggregate material,
said means for lifting the aggregate material in the drying section and the agitator means in the mixing section being flight bars attached to the interior of the drum, the flight bars in the mixing section being axially spaced from the flame shield to provide a settling area, said means for introducing hot asphalt into the aggregate material being constructed to direct hot asphalt into the settling area.

9. The apparatus of claim 8 having means for withdrawing exhaust gases from the mixing chamber, said means for withdrawing exhaust gases having an exhaust gas inlet pipe which projects inwardly beyond the flight bars.

* * * * *